United States Patent
Sharp et al.

(10) Patent No.: US 9,540,962 B2
(45) Date of Patent: Jan. 10, 2017

(54) POWER PLANT AIR COOLED HEAT EXCHANGER OR CONDENSER WITH PRESSURIZED GAS ENTRAINED COOLING LIQUID MISTER

(71) Applicant: Siemens Energy, Inc., Orlando, FL (US)

(72) Inventors: James H. Sharp, Orlando, FL (US); Monica B. Hansel, Melbourne, FL (US); Michael Scheurlen, Orlando, FL (US); Joshua A. Bernstein, Coconut Creek, FL (US)

(73) Assignee: Siemens Energy, Inc., Orlando, FL (US)

( * ) Notice: Subject to any disclaimer, the term of this patent is extended or adjusted under 35 U.S.C. 154(b) by 406 days.

(21) Appl. No.: 14/330,460

(22) Filed: Jul. 14, 2014

(65) Prior Publication Data
US 2016/0010510 A1    Jan. 14, 2016

(51) Int. Cl.
| | | |
|---|---|---|
| F01K 23/10 | (2006.01) | |
| F02C 6/18 | (2006.01) | |
| B05B 7/00 | (2006.01) | |
| F25B 39/02 | (2006.01) | |
| F25B 39/00 | (2006.01) | |

(52) U.S. Cl.
CPC .............. *F01K 23/10* (2013.01); *F02C 6/18* (2013.01); *B05B 7/00* (2013.01); *F25B 39/00* (2013.01); *F25B 39/028* (2013.01); *Y02E 20/16* (2013.01)

(58) Field of Classification Search
CPC ............ F01K 23/10; F02C 6/18; F02C 7/1435; F02C 7/143; Y02E 20/16; Y02T 50/67; F25B 39/00; F25B 39/028; F25B 2341/00; F25B 2341/001; F25B 2341/0011; F25B 2341/0012; F25B 2341/0014
See application file for complete search history.

(56) References Cited

U.S. PATENT DOCUMENTS

| | | | |
|---|---|---|---|
| 4,274,481 A | 6/1981 | Ireland et al. | |
| 4,301,861 A | 11/1981 | Larinoff | |
| 5,078,205 A | 1/1992 | Bodas et al. | |
| 7,721,811 B2 | 5/2010 | Reilly et al. | |
| 8,141,798 B2 | 3/2012 | Reilly et al. | |
| 8,671,688 B2 * | 3/2014 | Rogers | F01K 13/02 60/39.182 |
| 9,222,410 B2 * | 12/2015 | Chillar | F02C 6/08 |
| 2012/0031632 A1 | 2/2012 | Reilly et al. | |
| 2012/0096864 A1 | 4/2012 | Chillar et al. | |

* cited by examiner

Primary Examiner — Steven Sutherland
Assistant Examiner — Stefan Ibroni (57) ABSTRACT

An air cooled heat exchanger, such as a combustion turbine intercooler or rotor cooler or an air cooled condenser, utilizes a pressurized gas fluid entraining misting device that evaporatively cools conduits carrying the cooled fluid medium. Evaporative cooling liquid is entrained in the pressurized gas where it is atomized for evaporative cooling of the heat exchanger conduits. In some exemplary embodiments of the invention the misting device is a jet pump or ejector that entrains a supply of non-pressurized cooling liquid. In other exemplary embodiments of the invention the misting device is a misting emitter that entrains a supply of pressurized cooling liquid.

20 Claims, 4 Drawing Sheets

POWER PLANT AIR COOLED HEAT EXCHANGER OR CONDENSER WITH PRESSURIZED GAS ENTRAINED COOLING LIQUID MISTER

BACKGROUND OF THE INVENTION

1. Field of the Invention

The invention relates to air cooled heat exchangers, such as combustion/gas turbine engine intercoolers or engine rotor coolers, as well as combustion/gas turbine engine or steam turbine engine condensers, which employ external liquid coolant spray or misting of the heat exchanger conduits. More particularly the invention relates to air cooled heat exchangers that employ pressurized gas-entrained liquid coolant misting devices, such as pressurized gas/pressurized liquid coolant emitters or pressurized gas/non-pressurized liquid coolant ejectors/jet pumps, to enhance the heat exchanger's cooling efficiency. Such misting devices generate misting droplets with low likelihood of system clogging attributable to debris in the cooling liquid.

2. Description of the Prior Art

In a steam turbine power generation cycle spent steam exiting the turbine is cooled, condensed back to "clean" or "treated" working liquid and recycled through a boiler. The regenerated steam exiting the boiler is used to power the steam turbine, repeating the cycle. In a combined cycle combustion/steam turbine power plant a heat recovery steam generator (HRSG) that extracts heat from the combustion turbine exhaust is utilized to reheat condensed working liquid, rather than a separate boiler. Water cooled heat exchangers are commonly used to cool and condense spent steam that exits the steam turbines. The cooling water source is often a large body of water, such as a lake, river or the ocean. In some power plant locations it is not feasible to use a large body of water as a cooling source for water cooled heat exchangers.

An air cooled condenser (ACC) for cooling and condensing steam flow from turbines is often substituted for a water cooled heat exchanger where a large body of cooling water is not available or when federal, state or local regulations require a power plant operator to reduce cooling water consumption. One or more fans in the ACC enclosure or structure direct cooling air flow over the heat exchanger conduits that transport the working fluid condensing steam. However, unlike a water cooled heat exchanger, ACC heat transfer performance is dependent on heat capacitance of varying ambient air temperature at the power plant, as compared to the relatively predictable and unlimited heat capacitance and transfer rate of a large body of natural water. If the ambient temperature is extremely hot, i.e. a 41° C./105° F. day the overall performance of the steam turbine reduces dramatically due to insufficient cooling capacity available from an ACC. The lack of cooling requires the steam turbine (ST) to run at lower mass flow rates due to higher ST back pressures in order to prevent the steam turbine from entering an alarm state or even tripping, which reduces the overall performance of the power plant during the hot summer months. To address this condition, plant operators sometimes add fogging or misting evaporative systems under the ACC to lower the ambient air temperature and improve the performance of the ACC.

Currently known commercially available evaporative misting systems have been installed under ACCs to reduce the dry bulb temperature of the ambient air closer to the wet bulb temperature. One goal of the evaporative system is to atomize the water into as fine droplets as possible. The smaller the droplet the faster the water can evaporate, and the closer the nozzles can be to the inlet of the cooling fans that circulate the ambient cooling air throughout the ACC enclosure. A typical pressurized water nozzle with a high flow rate above 1 gallon per minute (GPM)/3.8 liters per minute (LPM) requires the average atomized size of the droplet to be on the order of 50-100 microns in diameter and requires water pressures on the order of 1000 PSI. There are fewer current commercially available pressurized nozzle options available, which are capable of producing 10 micron water droplets, but they cannot produce high flow rates at that water size due to the small orifices required. Over time the small nozzle orifices are prone to clogging with debris carried by the cooling water.

Commercially available jet pump or fluid ejector misting devices utilize pressurized gas flow through a nozzle to create a pressure drop and turbulence in an entrainment zone downstream of the nozzle outlet. A liquid feed source is in fluid communication with the entrainment zone. Pressure drop and turbulence in the entrainment zone suctions liquid from the liquid feed source. For example, in a naval pumping configuration, the ejector is used to remove non-pressurized standing water containing debris from ship compartments by suctioning the water, where it is subsequently entrained in the pressurized gas flow. In other applications ejectors can be utilized as misters by incorporating a diffuser downstream the pressurized gas nozzle outlet, so that the entrained fluid is dispersed as a mist.

Commercially available fire suppression misting devices or emitters utilize a non-combustible pressurized gas source, such as nitrogen, that is directed through a convergent nozzle to entrain pressurized water or fire retardant foam into a fogging mist. Entrained water droplets can be formed in a size range below 50 microns and as small as approximately 10 microns. Pressurized liquid sprayed through a nozzle orifice and the pressurized nitrogen sprayed from the converging nozzle outlet is directed toward a downstream deflector that entrains atomized droplets of the liquid into the nitrogen stream. The droplet atomizing deflector allows the pressurized liquid to be dispensed from relatively large diameter nozzle orifices that are not readily clogged.

SUMMARY OF THE INVENTION

Accordingly, a suggested object of exemplary embodiments of the invention is to develop an air cooled heat exchanger, such as an air cooled condenser (ACC) or gas turbine engine intercooler or a gas turbine engine rotor cooler evaporative misting system that generates misting droplets with low likelihood of system clogging attributable to debris in the cooling liquid.

Another suggested object of exemplary embodiments of the invention is to develop an air cooled heat exchanger, such as an air cooled condenser (ACC) or gas turbine engine intercooler or a gas turbine engine rotor cooler evaporative misting system, that generates atomized liquid droplet sizes between approximately 10 and 50 microns, where the cooling liquid contains particulates larger than 50 microns, with low likelihood of system clogging.

These and other objects are achieved in one or more embodiments of the invention by an air cooled heat exchanger, such as a gas turbine engine intercooler or a gas turbine engine rotor cooler or an air cooled condenser evaporative misting system, which utilizes a pressurized gas fluid entraining misting device that evaporatively cools conduits carrying the cooled fluid medium. Evaporative cooling liquid is entrained in the pressurized gas where it is atomized for evaporative cooling of the heat exchanger conduits. In some exemplary embodiments of the invention the misting device is a jet pump or ejector that entrains a supply of non-pressurized cooling liquid. In other exemplary embodiments of the invention the misting device is a misting emitter that entrains a supply of pressurized cooling liquid.

Exemplary embodiments of the invention feature a liquid mist and air cooled heat exchanger system, which includes an enclosure. The enclosure interior includes a heat exchange conduit for passage of a heated fluid medium that is to be cooled, such as steam condensate or gas turbine compressor bleed air. The enclosure also includes a pressurized gas misting device for introducing a gas-entrained liquid cooling mist in heat transfer communication with the heat exchange conduit. The mister includes a misting device housing, for passage of pressurized gas flow there through. The housing has a gas inlet, for receipt of pressurized gas flow. The housing has a cooling liquid inlet downstream of the gas inlet, for introducing cooling liquid in communication with the pressurized gas within an entrainment zone. The entrainment zone is also in communication with gas inlet and the cooling liquid inlet, for entraining the cooling liquid within the pressurized gas. The misting device has a misting outlet downstream the entrainment zone, for dispersing gas entrained cooling fluid mist into the enclosure, the cooling fluid mist transferring heat from the heated fluid medium through the heat exchange conduit. A pressurized gas supply is coupled to the misting device gas inlet. A cooling liquid supply is coupled to the misting device cooling liquid inlet.

In some embodiments the pressurized gas misting device is a misting emitter having a convergent nozzle downstream the misting inlet, with a misting emitter nozzle outlet in communication with the entrainment zone. A cooling liquid orifice is interposed between the cooling liquid inlet and the entrainment zone. A deflector is oriented downstream from the entrainment zone and in spaced relationship with the misting emitter nozzle outlet and the cooling liquid orifice, forming a portion of the misting outlet. In the misting emitter the cooling liquid supply is a pressurized cooling liquid supply coupled to the cooling liquid inlet.

Other exemplary embodiments of the invention feature a power plant air cooled condenser apparatus, having an enclosure including therein a heat exchange conduit for passage of steam turbine outlet steam that is to be cooled and condensed and a pressurized gas misting device for introducing a gas-entrained liquid cooling mist in heat transfer communication with the heat exchange conduit. The mister includes a misting device housing, for passage of pressurized gas flow there through; a gas inlet in the housing, for receipt of pressurized gas flow; and a cooling liquid inlet downstream of the gas inlet, for introducing cooling liquid in communication with the pressurized gas. An entrainment zone in the housing is in communication with gas inlet and the cooling liquid inlet, for entraining the cooling liquid within the pressurized gas. A misting outlet is downstream of the entrainment zone, for dispersing gas entrained cooling fluid mist into the enclosure. The cooling fluid mist transfers heat from the steam turbine outlet steam through the heat exchange conduit. A pressurized compressed air gas supply is coupled to the misting device gas inlet; and a cooling liquid water supply is coupled to the misting device cooling liquid inlet.

Yet other exemplary embodiments of the invention feature a method for cooling a heated fluid medium with an air cooled heat exchanger system. The method is practiced by providing a liquid mist and air cooled heat exchanger system, including an enclosure. The provided enclosure includes a heat exchange conduit for passage of a heated fluid medium that is to be cooled and a pressurized gas misting device for introducing a gas-entrained liquid cooling mist in heat transfer communication with the heat exchange conduit. The provided mister includes a misting device housing, for passage of pressurized gas flow there through; a gas inlet in the housing, for receipt of pressurized gas flow; a cooling liquid inlet downstream of the gas inlet, for introducing cooling liquid in communication with the pressurized gas. An entrainment zone is in communication with gas inlet and the cooling liquid inlet, for entraining the cooling liquid within the pressurized gas. The provided mister also has a misting outlet downstream the entrainment zone, for dispersing gas entrained cooling fluid mist into the enclosure so that the cooling fluid mist transfers heat from the heated fluid medium through the heat exchange conduit. A provided pressurized gas supply is coupled to the misting device gas inlet and a cooling liquid supply is coupled to the misting device cooling liquid inlet. The method is practiced by circulating a heated fluid medium through the heat exchange conduit. Pressurized gas is introduced from the pressurized gas supply into the gas inlet; and cooling liquid from the cooling liquid supply is introduced into the cooling liquid inlet. The gas entrained cooling fluid mist is dispensed within the enclosure, thereby transferring heat from the heated fluid medium through the heat exchange conduit to the cooling fluid mist.

The respective objects and features of the present invention may be applied jointly or severally in any combination or sub-combination by those skilled in the art.

BRIEF DESCRIPTION OF THE DRAWINGS

Exemplary embodiments of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

After considering the following description, those skilled in the art will clearly realize that exemplary embodiments of the invention can be readily utilized in air cooled heat exchangers, such as combustion turbine intercoolers or a rotor coolers or air cooled condensers, which utilize one or more pressurized gas fluid entraining misting devices that evaporatively cool conduits carrying the cooled fluid medium. Evaporative cooling liquid is entrained in the pressurized gas where it is atomized for evaporative cooling of the heat exchanger conduits. In some exemplary embodiments of the invention the misting device is a jet pump or ejector that entrains a supply of non-pressurized cooling liquid. In other exemplary embodiments of the invention the misting device is a misting emitter that entrains a supply of pressurized cooling liquid.

Figure 1:
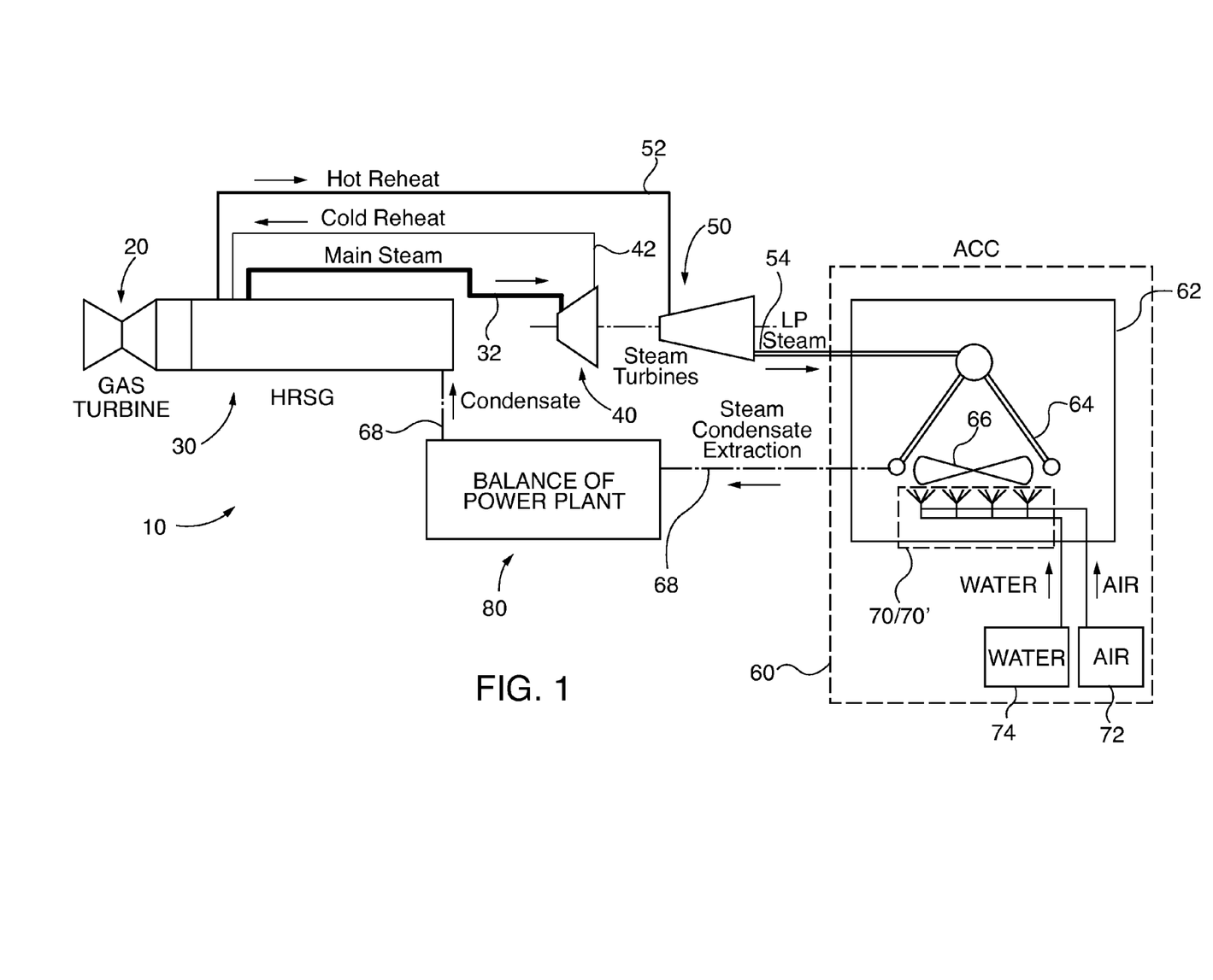
FIG. 1 is a schematic view of a power plant incorporating an air cooled condenser liquid mist and air cooled heat exchanger that is constructed in accordance with an exemplary embodiment of the invention.

The power plant 10 includes a combustion or gas turbine engine 20, the exhaust of which is coupled to a heat recovery steam generator (HRSG) 30. The HSRG 30 main steam output 32 drives a high pressure steam turbine (HPST) 40. Cold reheat steam from the HPST 40 is returned to the HSRG 30 for reheating, via cold reheat steam line 42. The hot reheated steam is routed to low a pressure steam turbine (LPST) 50 via hot reheat steam line 52. Low pressure steam exiting the LPST 50 is then re-condensed for recycling back to the HRSG 30, continuously repeating combined cycle power generation in known fashion. This is one of many possible power plant combinations available to those skilled in the art.

In the power plant 10 of FIG. 1, the low pressure steam exiting the LPST 50 via low pressure steam line 54 is condensed in the ACC 60 liquid mist and air cooled heat exchanger that is constructed in accordance with an exemplary embodiment of the present invention. The ACC 60 has an enclosure 62, which can include, but not limited to wind walls, evaporative cooling media, and water retention pond. One or more heat exchanger conduits 64 are coupled to the low pressure steam line 54, where the heated steam fluid medium that is to be cooled passes through the conduit(s) and is condensed back to liquid coolant, such as demineralized treated water. For simplicity, only one conduit 64 is shown in the figure. The cooling fan 66 drives air across the heat exchanger conduits 64 exterior for increasing convective heat transfer efficiency. An optional design variant can be developed with the removal of the cooling fan and replacement of enclosure 62 with a hyperbolic natural draft tower to induce air flow. One or more pressurized gas misting devices 70/70' introduce gas entrained liquid cooling mist in heat transfer communication with the heat exchange conduit. The evaporating mist provided by the misting devices 70/70' increases the ACC's overall heat transfer efficiency. Pressurized gas (such as compressed air) and cooling liquid (such as untreated cooling water) supplies 72, 74 are coupled to the misting devices 70/70'. Cooled low pressure steam condensate exits the ACC 60 via condensate line 68, where it is routed through the balance of the power plant 80 and back to the HRSG 30.

Figure 2:
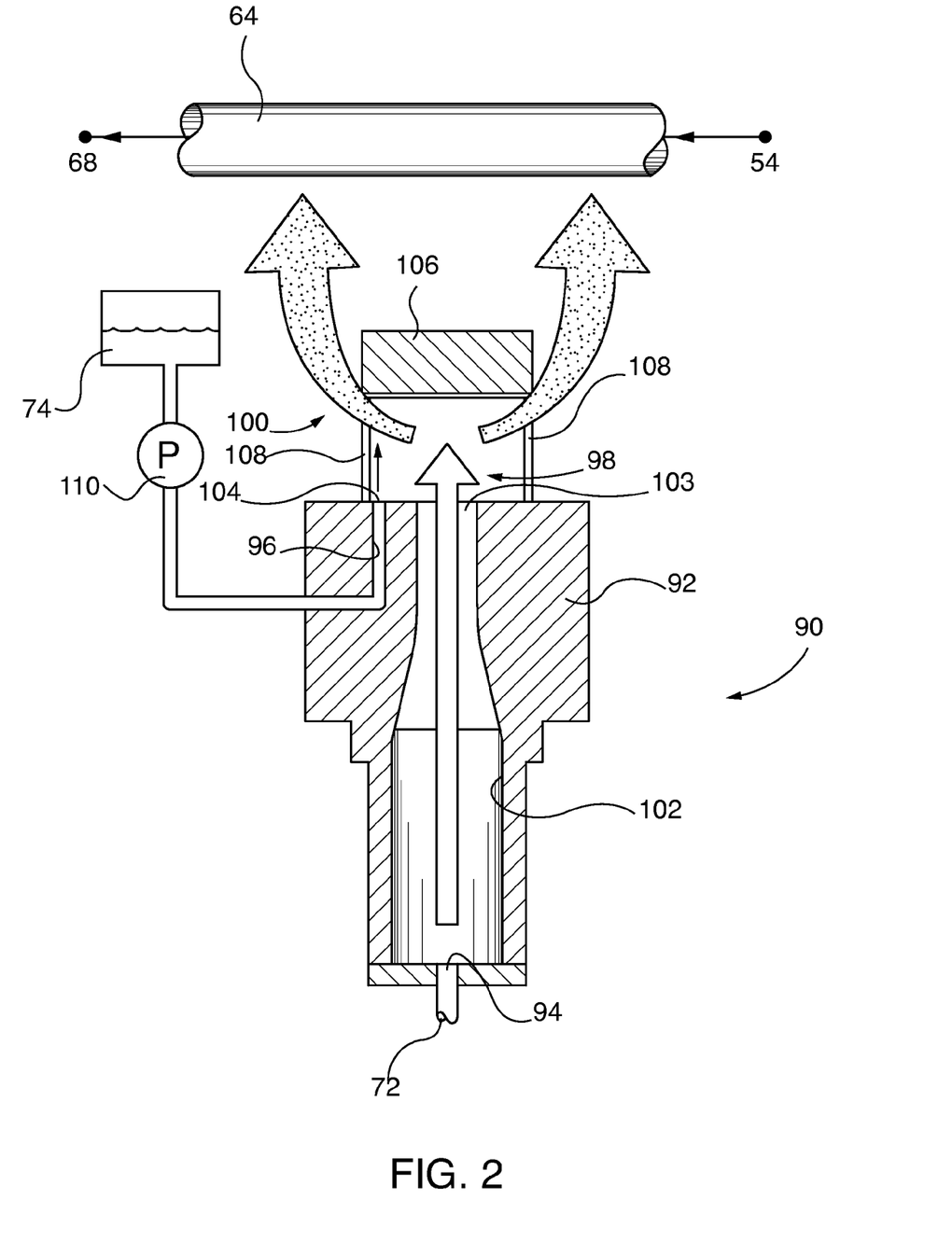
FIG. 2 is a cross sectional view of an exemplary pressurized gas misting emitter used in a liquid mist and air cooled heat exchanger that is constructed in accordance with an exemplary embodiment of the invention.

An exemplary embodiment pressurized gas misting device 70, namely an emitter 90, is shown in FIG. 2. The emitter 90 is commercially available and provides a relatively high flow rate of greater than 1 GPM entrained liquid flow rate of atomized droplets 50 microns or less in size and as small as 10 microns. Smaller atomized droplets facilitate greater evaporative heat transfer cooling rates than relatively larger droplets, which also advantageously allow each emitter 90 to cool a larger volume of the ACC 60 enclosure than known pressurized liquid only nozzle sprayers that have been used in the past for ACC misting applications. The emitter 90 also advantageously allows clog-resistant passage of untreated cooling water liquid, which can contain particulates larger than 50 microns. Known pressurized nozzle sprayers previously used in misting ACC applications become more clog-prone as the spray nozzle diameter decreases, so droplet output size must be larger in order to maintain acceptable cooling system reliability.

The emitter 90 has an emitter housing 92 that defines a gas inlet 94, which is coupled to the pressurized gas source 72 (e.g., a compressed air source) and a cooling inlet 96 which is coupled to the cooling liquid source 74 (e.g., untreated cooling water). An entrainment zone 98 is downstream of the gas inlet 94 and the cooling inlet 96, where the compressed air (double arrow) mixes with the cooling liquid (solid arrow) and entrains atomized cooling liquid droplets (arrow with droplet dots) for exhaust through a misting outlet 100. The emitter housing 92 further defines a convergent nozzle 102, where the pressurized gas compressed air is discharged into the entrainment zone 98 through nozzle outlet 103. The cooling liquid is pressurized by pump 110 and discharges into the entrainment zone 98 through orifice 104. The orifice diameter is of relatively large diameter (e.g., greater than 50 microns) for relatively easy clog-free passage of any particulate matter in the cooling water supply. The downstream portion of the entrainment zone 98 and the misting outlet 100 are defined by a deflector 106, which enhances entrainment of the fluid within the pressurized gas. The deflector supports 108 maintain relative spaced position of the deflector 106 relative to the nozzle outlet 103 and the fluid orifice 104.

Figure 3:
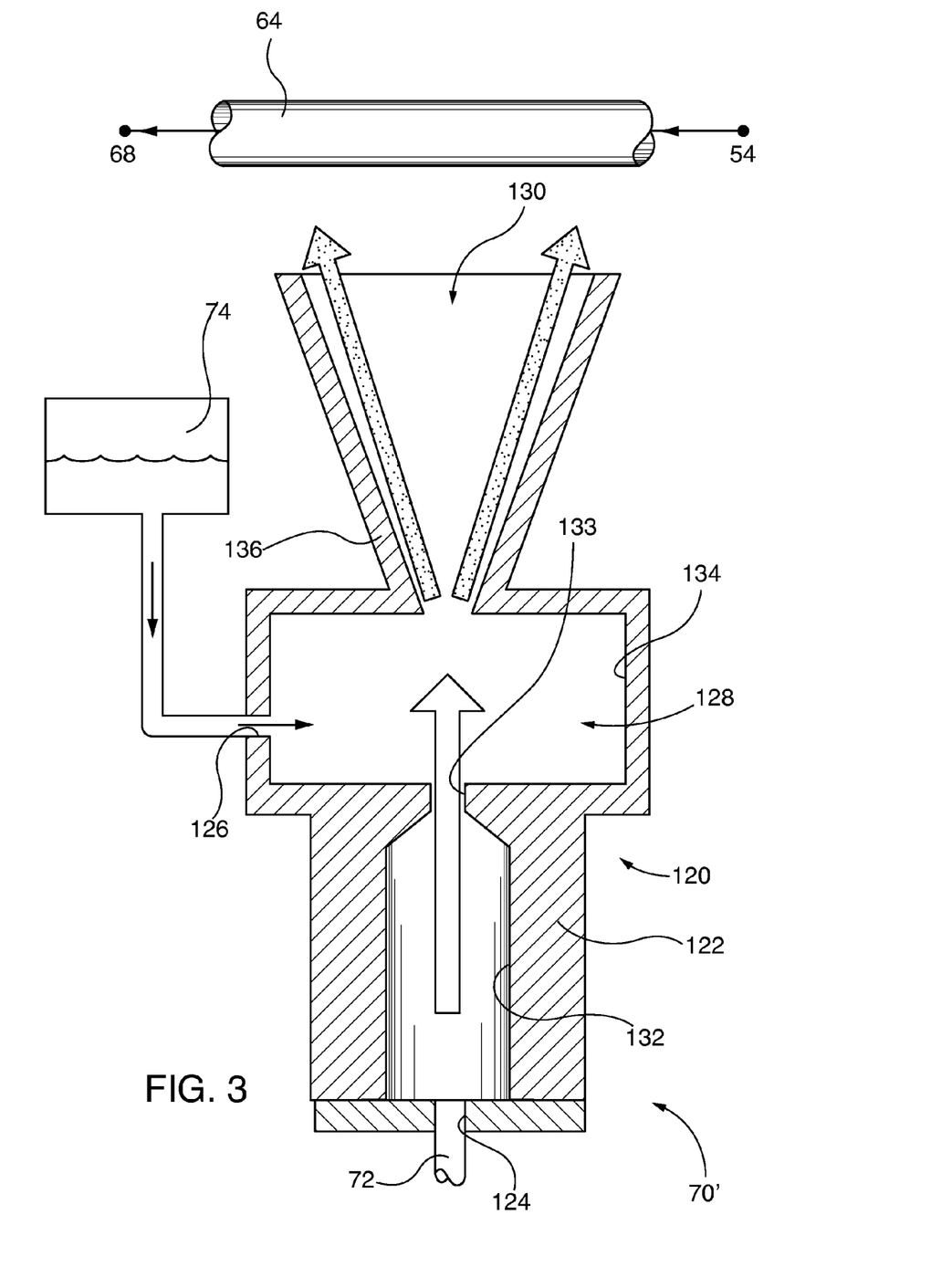
FIG. 3 is a cross sectional view of an exemplary pressurized gas misting ejector or jet pump used in a liquid mist and air cooled heat exchanger that is constructed in accordance with an exemplary embodiment of the invention.

Another exemplary embodiment pressurized gas misting device 70', namely a known construction fluid ejector or jet pump 120, is shown in FIG. 3. The fluid ejector 120 has an ejector housing 122 that defines a gas inlet 124, which is coupled to the pressurized gas source 72 (e.g., a compressed air source) and a cooling inlet 126 which is coupled to the cooling liquid source 74 (e.g., untreated cooling water). An entrainment zone 128 is downstream of the gas inlet 124 and the cooling inlet 126, where the compressed air (double arrow) mixes with the cooling liquid (solid arrow) and entrains atomized cooling liquid droplets (arrow with droplet dots) for exhaust through a misting outlet 130. The ejector housing 122 further defines a mixing nozzle 132, where the pressurized gas compressed air is discharged into the entrainment zone 128 through mixing nozzle outlet 133. The non-pressurized cooling liquid from the cooling liquid supply 74 is suctioned into the entrainment zone 98 through the cooling liquid inlet 126. The cooling liquid inlet 126 cross sectional area is relatively large for relatively easy clog-free passage of any particulate matter in the cooling water supply. The entrainment zone 128 and the misting outlet 130 are respectively defined by a mixing chamber 134 and a diffuser 136.

Figure 4:
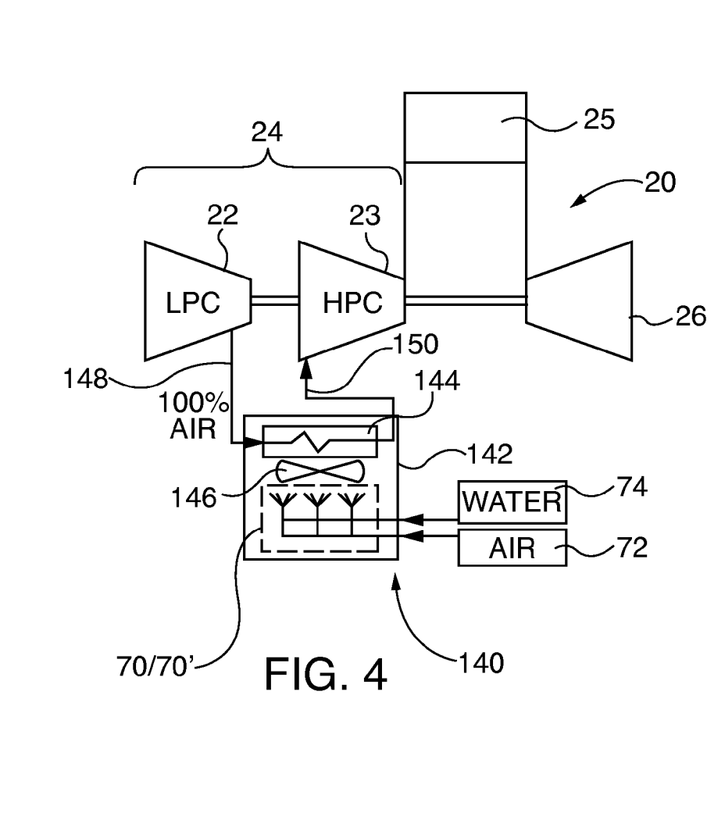
FIG. 4 is a schematic view of a gas turbine engine incorporating a liquid mist and air cooled intercooler that is constructed in accordance with an exemplary embodiment of the invention.

FIG. 4 is a schematic diagram of a known gas turbine engine 20 having a multi-stage low pressure compressor (LPC) 22 and a high pressure compressor (HPC) 23 (collectively compressor section 24) that feed compressed combustion air to the combustor 25. The combusted air is then fed to the turbine 26. The turbine engine 20 utilizes an intercooler 140 liquid mist and air cooled heat exchanger system, which is constructed in accordance with an exemplary embodiment of the invention, rather than a more commonly used water intercooler. The intercooler 140 has an enclosure 142, which retains heat exchanger conduits 144 and an optional cooling fan 146. Pressurized gas misters 70/70', constructed in accordance with the embodiments of the respective FIGS. 2 and 3, are coupled to the water supply 74 and the pressurized gas supply 76. The intercooler 140 is interposed between the LPC air exhaust 148 and the HPC air intake 150, with the compressor air being the heated fluid medium in the heat exchange conduit(s) 164.

Figure 5:
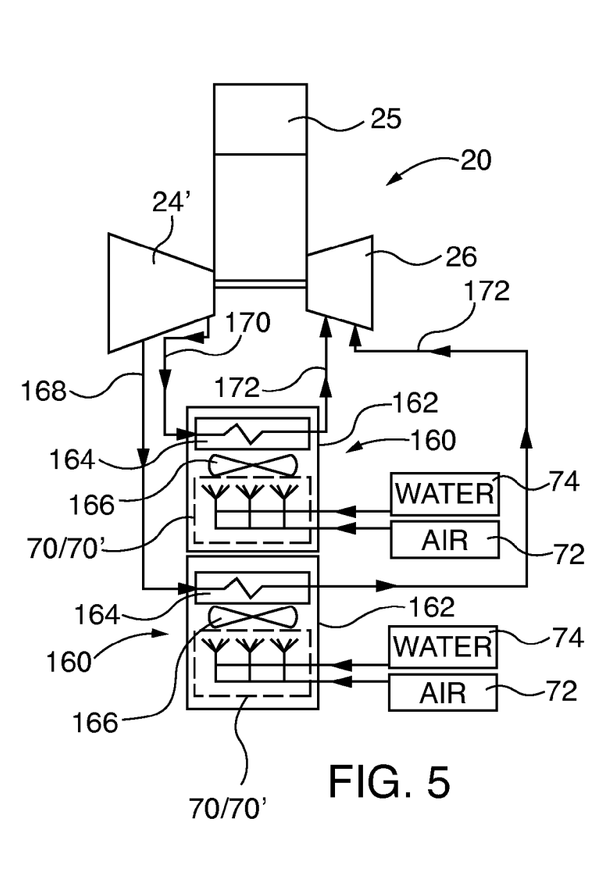
FIG. 5 is a schematic view of a gas turbine engine incorporating a pair of liquid mist and air cooled rotor coolers that are constructed in accordance with an exemplary embodiment of the invention.

FIG. 5 is a schematic diagram of a known gas turbine engine 20 having a compressor 24' that feeds compressed combustion air to the combustor section 25. The combusted air is then fed to the turbine 26. The turbine engine 20 utilizes one or more (two are shown) rotor air coolers (RAC) 160 liquid mist and air cooled heat exchanger systems, which are constructed in accordance with an exemplary embodiment of the invention, rather than more commonly used water cooled RACs. Each RAC 160 has an enclosure 162, which retains heat exchanger conduits 164 and an optional cooling fan 166. Pressurized gas misters 70/70', constructed in accordance with the embodiments of the respective FIGS. 2 and 3, are coupled to the water supply 74 and the pressurized gas supply 76. The lower RAC 160 is coupled to an intermediate pressure bleed air supply line 168 and the now cooled intermediate pressure bleed air is routed to the turbine section rotor in known fashion via the cooled intermediate pressure bleed air supply line 172. Similarly, the upper RAC 160 is coupled to the high pressure bleed air supply line 170 and the now cooled high pressure bleed air is routed to the turbine section rotor in known fashion via the cooled high pressure bleed air supply line 174.

Although various embodiments that incorporate the teachings of the present invention have been shown and described in detail herein, those skilled in the art can readily devise many other varied embodiments that still incorporate these teachings. The invention is not limited in its application to the exemplary embodiment details of construction and the arrangement of components set forth in the description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings.

What is claimed is:

1. A liquid mist and air cooled heat exchanger system, comprising:
   an enclosure including therein:
      a heat exchange conduit for passage of a heated fluid medium that is to be cooled;
      wherein the heat exchange conduit is one of a gas turbine compressor bleed conduit and a power plant condensate conduit downstream of a HRSG;
      a pressurized gas misting device for introducing a gas-entrained liquid cooling mist in heat transfer communication with the heat exchange conduit, the pressurized gas misting device including:
         a misting device housing, for passage of pressurized gas flow there through;
         a gas inlet in the misting device housing, for receipt of the pressurized gas flow;
         a cooling liquid inlet downstream of the gas inlet, for introducing cooling liquid in communication with the pressurized gas flow;
         an entrainment zone in communication with gas inlet and the cooling liquid inlet, for entraining the cooling liquid within the pressurized gas flow;
         a misting outlet downstream the entrainment zone, for dispersing gas entrained cooling fluid mist into the enclosure, the cooling fluid mist transferring heat from the heated fluid medium through the heat exchange conduit;
   a pressurized gas supply coupled to the gas inlet; and
   a cooling liquid supply coupled to the cooling liquid inlet.

2. The liquid mist and air cooled heat exchanger of claim 1, wherein the heated fluid medium is power plant steam condensate.

3. The liquid mist and air cooled heat exchanger system of claim 1, comprising a gas or combustion turbine engine intercooler or rotor cooler, wherein the heated fluid medium is air compressed by an engine compressor section.

4. The liquid mist and air cooled heat exchanger system of claim 1, further comprising: the pressurized gas misting device being a misting emitter having: a convergent nozzle downstream the gas inlet, having an misting emitter nozzle outlet in communication with the entrainment zone; a cooling liquid orifice between the cooling liquid inlet and the entrainment zone; and a deflector downstream from the entrainment zone and in spaced relationship with the misting emitter nozzle outlet and the cooling liquid orifice, forming a portion of the misting outlet; and the cooling liquid supply is a pressurized cooling liquid supply coupled to the cooling liquid inlet.

5. The liquid mist and air cooled heat exchanger system of claim 4, a misting emitter mist droplet size comprising between 10 and 50 microns, the pressurized gas flow comprising compressed air and the pressurized cooling liquid comprising water including particulates larger than 50 microns.

6. The liquid mist and air cooled heat exchanger system of claim 1, further comprising: the pressurized gas misting device being a fluid ejector or a jet pump having: a mixing nozzle downstream the gas inlet, having a mixing nozzle outlet in communication with the entrainment zone; and a diffuser forming the entrainment zone and the misting outlet; and the cooling liquid supply is a non-pressurized cooling liquid supply coupled to the cooling liquid inlet.

7. A power plant air cooled condenser apparatus, comprising:
   an enclosure including therein:
      a heat exchange conduit for passage of steam turbine outlet steam that is to be cooled and condensed;
      a pressurized gas misting device for introducing a gas-entrained liquid cooling mist in heat transfer communication with the heat exchange conduit, the pressurized gas misting device including:
         a misting device housing, for passage of pressurized gas flow there through;
         a gas inlet in the misting device housing, for receipt of the pressurized gas flow;
         a cooling liquid inlet downstream of the gas inlet, for introducing cooling liquid in communication with the pressurized gas flow;
         an entrainment zone in communication with gas inlet and the cooling liquid inlet, for entraining the cooling liquid within the pressurized gas flow;
         a misting outlet downstream the entrainment zone, for dispersing gas entrained cooling fluid mist into the enclosure, the cooling fluid mist transferring heat from the steam turbine outlet steam through the heat exchange conduit;

a pressurized compressed air gas supply coupled to the gas inlet;

a cooling liquid water supply coupled to the cooling liquid inlet; and wherein the power plant air cooled condenser apparatus is downstream of a heat recovery steam generator (HRSG).

8. The power plant air cooled condenser apparatus of claim 7, further comprising a cooling fan in fluid communication with the misting outlet within the enclosure, for circulating cooling fluid mist within the enclosure.

9. The power plant air cooled condenser of claim 8, the enclosure comprising a wind wall or evaporative cooling media or a water retention pond or a hyperbolic natural draft cooling tower.

10. The power plant air cooled condenser of claim 7, further comprising: the pressurized gas misting device being a misting emitter having: a convergent nozzle downstream the gas inlet, having an misting emitter nozzle outlet in communication with the entrainment zone; a cooling liquid orifice between the cooling liquid inlet and the entrainment zone; and a deflector downstream from the entrainment zone and in spaced relationship with the misting emitter nozzle outlet and the cooling liquid orifice, forming a portion of the misting outlet; and the cooling liquid water supply is a pressurized cooling liquid water supply coupled to the cooling liquid inlet.

11. The power plant air cooled condenser apparatus of claim 10, a misting emitter mist droplet size comprising between 10 and 50 microns, the pressurized gas flow comprising compressed air and the pressurized cooling water supply including particulates larger than 50 microns.

12. The power plant air cooled condenser apparatus of claim 7, further comprising: the pressurized gas misting device being a fluid ejector or jet pump having: a mixing nozzle downstream the gas inlet, having a mixing nozzle outlet in communication with the entrainment zone; and a diffuser forming the entrainment zone and the misting outlet; and the cooling liquid water supply is a non-pressurized cooling liquid supply coupled to the cooling liquid inlet.

13. The power plant air cooled condenser apparatus of claim 7 in a power plant, further comprising: a combustion turbine having an exhaust system for passage of heated exhaust; a heat recovery steam generator (HRSG) coupled to the exhaust system, for heating steam with a turbine heated exhaust; at least one steam turbine coupled to the heat recovery steam generator, powered by the steam heated by the HRSG and exhausting steam turbine outlet steam; and the power plant air cooled condenser apparatus, coupled to the at least one steam turbine, for condensing the steam turbine outlet steam.

14. A method for cooling a heated fluid medium with an air cooled heat exchanger system, comprising:

providing a liquid mist and air cooled heat exchanger system, including:
an enclosure including therein:
a heat exchange conduit for passage of a heated fluid medium that is to be cooled;
wherein the heat exchange conduit is one of a gas turbine compressor bleed conduit and a power plant condensate conduit downstream of a HRSG,
a pressurized gas misting device for introducing a gas-entrained liquid cooling mist in heat transfer communication with the heat exchange conduit, the pressurized gas misting device including:
a misting device housing, for passage of pressurized gas flow there through;
a gas inlet in the misting device housing, for receipt of the pressurized gas flow;
a cooling liquid inlet downstream of the gas inlet, for introducing cooling liquid in communication with the pressurized gas flow;
an entrainment zone in communication with the gas inlet and the cooling liquid inlet, for entraining the cooling liquid within the pressurized gas flow;
a misting outlet downstream the entrainment zone, for dispersing gas entrained cooling fluid mist into the enclosure, the cooling fluid mist transferring heat from the heated fluid medium through the heat exchange conduit;
a pressurized gas supply coupled to gas inlet; and
a cooling liquid supply coupled to the cooling liquid inlet;
circulating a heated fluid medium through the heat exchange conduit;
introducing pressurized gas from the pressurized gas supply into the gas inlet;
introducing cooling liquid from the cooling liquid supply into the cooling liquid inlet; and
dispensing the gas entrained cooling fluid mist within the enclosure, thereby transferring heat from the heated fluid medium through the heat exchange conduit to the cooling fluid mist.

15. The method of claim 14, the pressurized gas misting device comprising: a misting emitter having: a convergent nozzle downstream the gas inlet, having an misting emitter nozzle outlet in communication with the entrainment zone; a cooling liquid orifice between the cooling liquid inlet and the entrainment zone; and a deflector downstream from the entrainment zone and in spaced relationship with the misting emitter nozzle outlet and the cooling liquid orifice, forming a portion of the misting outlet; and wherein the cooling liquid supply is a pressurized cooling liquid supply coupled to the cooling liquid inlet.

16. The method of claim 15, further comprising forming misting emitter droplet size between 10 and 50 microns, wherein the pressurized gas flow includes compressed air and the pressurized cooling liquid includes water having particulates larger than 50 microns.

17. The method of claim 14, the pressurized gas misting device comprising: a fluid ejector or jet pump having: a mixing nozzle downstream the gas inlet, having a mixing nozzle outlet in communication with the entrainment zone; and a diffuser forming the entrainment zone and the misting outlet; and wherein the cooling liquid supply is a non-pressurized cooling liquid supply coupled to the cooling liquid inlet.

18. A power plant having air cooled condenser heat exchanger cooling for condensing heated fluid medium steam turbine outlet steam that is operated in accordance with the method of claim 14.

19. The power plant of claim 18, the pressurized gas misting device that is operated in accordance with said method comprising: a misting emitter having: a convergent nozzle downstream the misting inlet, having an misting emitter nozzle outlet in communication with the entrainment zone; a cooling liquid orifice between the cooling liquid inlet and the entrainment zone; and a deflector downstream from the entrainment zone and in spaced relationship with the misting emitter nozzle outlet and the cooling liquid orifice, forming a portion of the misting outlet; and wherein the cooling liquid supply is a pressurized cooling liquid supply coupled to the cooling liquid inlet.

20. A power plant having air cooled intercooler or rotor air cooler heat exchanger cooling for cooling gas or combustion turbine compressor bleed air that is operated in accordance with the method of claim 14.

* * * * *